US010121607B2

(12) United States Patent
Joos et al.

(10) Patent No.: US 10,121,607 B2
(45) Date of Patent: Nov. 6, 2018

(54) CERAMIC SEPARATOR FOR ULTRACAPACITORS

(71) Applicant: Corning Incorporated, Corning, NY (US)

(72) Inventors: Felipe Miguel Joos, Addison, NY (US); Satyanarayana Kodali, North Canton, OH (US); Atul Kumar, Horseheads, NY (US); Charles Warren Lander, Wayland, NY (US); Kamjula Pattabhirami Reddy, Corning, NY (US); Huthavahana Kuchibhotla Sarma, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 176 days.

(21) Appl. No.: 14/166,523

(22) Filed: Jan. 28, 2014

(65) Prior Publication Data
US 2015/0055275 A1 Feb. 26, 2015

Related U.S. Application Data

(60) Provisional application No. 61/868,864, filed on Aug. 22, 2013.

(51) Int. Cl.
*H01G 11/52* (2013.01)
*H01G 11/32* (2013.01)
(Continued)

(52) U.S. Cl.
CPC ............ *H01G 11/52* (2013.01); *H01G 11/32* (2013.01); *H01G 11/86* (2013.01); *H01M 2/145* (2013.01);
(Continued)

(58) Field of Classification Search
CPC ...... H01G 11/152; H01G 11/32; H01G 11/86; H01G 11/52
See application file for complete search history.

(56) References Cited

U.S. PATENT DOCUMENTS 2,888,377 A * 5/1959 Allen ...................... C01B 33/22
106/470
3,364,077 A 1/1968 Arrance et al.
(Continued)

FOREIGN PATENT DOCUMENTS

JP 60043811 A * 3/1985
JP 4348511 A 12/1992
(Continued)

OTHER PUBLICATIONS

PCT/US2014/051773 Invitation to Pay Additional Fees, mailed Nov. 4, 2014.
(Continued)

*Primary Examiner* — Nathan Milakovich
(74) *Attorney, Agent, or Firm* — Shantanu Pathak

(57) ABSTRACT

A separator such as for an electrochemical double layer capacitor includes acicular inorganic particles that are dried to form a porous membrane. Example inorganic particles are calcium silicate particles. A deposition method implementing slurry that includes the acicular inorganic particles and a dispersing medium along with a binder material can be used to form the separator layer directly on electrode materials.

14 Claims, 10 Drawing Sheets

(51) Int. Cl.
*H01G 11/86* (2013.01)
*H01M 2/14* (2006.01)
*H01M 2/16* (2006.01)

(52) U.S. Cl.
CPC ......... *H01M 2/166* (2013.01); *H01M 2/1673* (2013.01); *Y02E 60/13* (2013.01)

(56) References Cited

U.S. PATENT DOCUMENTS

| | | | |
|---|---|---|---|
| 3,379,570 A | 4/1968 | Berger et al. | |
| 4,187,210 A * | 2/1980 | Howard, Jr. | C08F 10/02 264/294 |
| 4,482,665 A * | 11/1984 | Dix | C08K 3/34 257/E23.119 |
| 5,882,721 A * | 3/1999 | Delnick | H01M 2/164 427/77 |
| 6,084,767 A | 7/2000 | Day et al. | 361/512 |
| 6,096,456 A | 8/2000 | Takeuchi et al. | |
| 6,296,969 B1 | 10/2001 | Yano et al. | |
| 6,426,865 B2 * | 7/2002 | Kasahara | H01G 9/02 29/25.03 |
| 7,525,788 B2 | 4/2009 | Hoerpel et al. | 361/503 |
| 8,159,815 B2 | 4/2012 | Aida et al. | 361/505 |
| 8,784,510 B2 * | 7/2014 | Miller | H01G 9/02 29/25.03 |
| 9,105,908 B2 * | 8/2015 | Peuchert | C03C 12/00 |
| 9,520,580 B2 * | 12/2016 | Sayre | H01M 2/0262 |
| 2005/0271947 A1 * | 12/2005 | Nilsson | H01M 2/145 429/251 |
| 2006/0036012 A1 * | 2/2006 | Hayes | B32B 27/20 524/445 |
| 2008/0089013 A1 * | 4/2008 | Zhong | C04B 35/532 361/502 |
| 2009/0122466 A1 | 5/2009 | Blankenbeckler | |
| 2010/0091425 A1 * | 4/2010 | Takeoka | H01G 2/103 361/301.4 |
| 2010/0171081 A1 | 7/2010 | Gunderman et al. | 252/501.1 |
| 2010/0316912 A1 | 12/2010 | Hashimoto et al. | |
| 2011/0206972 A1 | 8/2011 | Hashimoto et al. | |
| 2012/0003525 A1 | 1/2012 | Hashimoto et al. | |
| 2013/0149613 A1 | 6/2013 | Yoshikawa et al. | |
| 2013/0330637 A1 * | 12/2013 | Matsumoto | H01G 11/52 429/344 |
| 2014/0217992 A1 * | 8/2014 | Li | H01M 2/1646 320/148 |
| 2015/0171398 A1 * | 6/2015 | Roumi | H01M 2/1673 429/7 |
| 2015/0179347 A1 * | 6/2015 | Gibson | H01G 11/38 429/339 |
| 2015/0349313 A1 * | 12/2015 | Budd | H01G 11/52 429/163 |
| 2015/0357127 A1 * | 12/2015 | Horii | H01G 11/34 361/502 |
| 2016/0111226 A1 * | 4/2016 | Gibson | H01M 10/0567 429/122 |

FOREIGN PATENT DOCUMENTS

| | | | |
|---|---|---|---|
| JP | 9082572 A | | 3/1997 |
| JP | 2000058388 A | | 2/2000 |
| JP | 3025338 | | 3/2000 |
| JP | 2003297678 A | | 10/2003 |
| JP | 2005285605 | | 10/2005 |
| JP | 03764604 B2 | | 4/2006 |
| JP | 2006338917 A | | 12/2006 |
| JP | 2006338918 A | | 12/2006 |
| JP | 2007067155 A | | 3/2007 |
| JP | 2007095440 A | | 4/2007 |
| JP | 2007227231 A | | 9/2007 |
| JP | 2007257904 A | | 10/2007 |
| JP | 2007287781 A * | | 11/2007 |
| JP | 2008186707 A | | 8/2008 |
| JP | 2009076486 A | | 4/2009 |
| JP | 2009111107 A * | | 5/2009 |
| JP | 04339729 B2 | | 10/2009 |
| JP | 2010231899 A | | 10/2010 |
| JP | 2010232205 A | | 10/2010 |
| JP | 2010238640 A | | 10/2010 |
| JP | 2010239028 A | | 10/2010 |
| JP | 2010277800 A | | 12/2010 |
| JP | 2011054891 | | 3/2011 |
| JP | 04873703 B2 | | 2/2012 |
| JP | WO 2012115092 A1 * | 8/2012 | ............ H01G 11/52 |
| KR | 20130083211 | | 7/2013 |
| KR | 20130083211 A * | | 7/2013 |
| WO | 2011/112532 | | 9/2011 |
| WO | 2012115092 | | 8/2012 |

OTHER PUBLICATIONS

International Search Report, issued in connection with corresponding PCT application No. PCT/US2014/051773, dated Oct. 8, 2015.

Arora, P., and Zhang, Z., "Battery separators", Chem. Rev. 2004, 104(10), pp. 4419-4462.

* cited by examiner

CERAMIC SEPARATOR FOR ULTRACAPACITORS

CROSS-REFERENCE TO RELATED APPLICATIONS

This application claims the benefit of priority under 35 U.S.C. § 119 of U.S. application Ser. No. 61/868,864 filed on Aug. 22, 2013, the entire content of which is hereby incorporated by reference.

BACKGROUND

Field

The present disclosure relates generally to ultracapacitors, and more specifically to ceramic separators and their methods of production for use in ultracapacitors.

Technical Background

Electric double layer capacitors (EDLCs), also known as ultracapacitors, are devices with high power density and relatively high energy density compared to conventional electrolytic capacitors. EDLC's utilize high surface area electrode materials and thin electrolytic dielectrics to achieve capacitances that are several orders of magnitude higher than in conventional capacitors. EDLCs can be used for energy storage.

A typical EDLC includes a positive and a negative electrode, each comprising an activated (porous) carbon layer laminated onto a respective aluminum current collector foil. The two electrodes are separated by a porous separator and the assembly is wound into a jelly roll configuration that is then packaged in an enclosure containing aqueous or organic electrolyte. The porous separator between the electrodes permits the flow of ionic charge, but prevents electrical contact between the electrodes.

There is a need to develop a separator material for use in ultracapacitors that is resistant to chemical degradation at high temperatures and high voltages. Associated methods for forming such a separator material are also needed.

BRIEF SUMMARY

In accordance with embodiments, an inorganic separator includes acicular particles such as calcium silicate ($CaSiO_3$) mineral particles. Such a fibrous material may be applied via a slurry process directly onto a porous, activated carbon-based electrode to form an integrated separator. The use of an inorganic material for the separator layer provides chemical stability, while the slurry coating process promotes mechanical strength and dimensional stability. The inorganic separator may comprise a glass material or a ceramic material.

In embodiments, the overall integrity of the separator-coated electrode and its attendant functionality can be affected by, inter alia, the particle size and particle size distribution of the calcium silicate (e.g., Wollastonite) particles incorporated into the slurry, and the resulting porosity of the deposited layer. In contrast to conventional EDLC separators, which are independently formed as a free-standing layer that is subsequently laminated onto an electrode surface, the "integrated separators" disclosed herein are formed in situ directly on a surface of the carbon-based electrode. Multiple deposition steps can be used to build up a separator layer of increased thickness, and/or to have cooperative functionality such as one sub-layer within the separator layer that provides heat resistance and a second sub-layer that provides dimensional stability.

The integrated separators disclosed herein may be incorporated into various devices, including energy storage devices such as EDLCs, hybrid capacitors and batteries (e.g., lithium-ion batteries) and energy conversion devices such as fuel cells. Also disclosed is the use in an energy storage device of an integrated ceramic separator disposed between opposing (first and second) current collectors.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
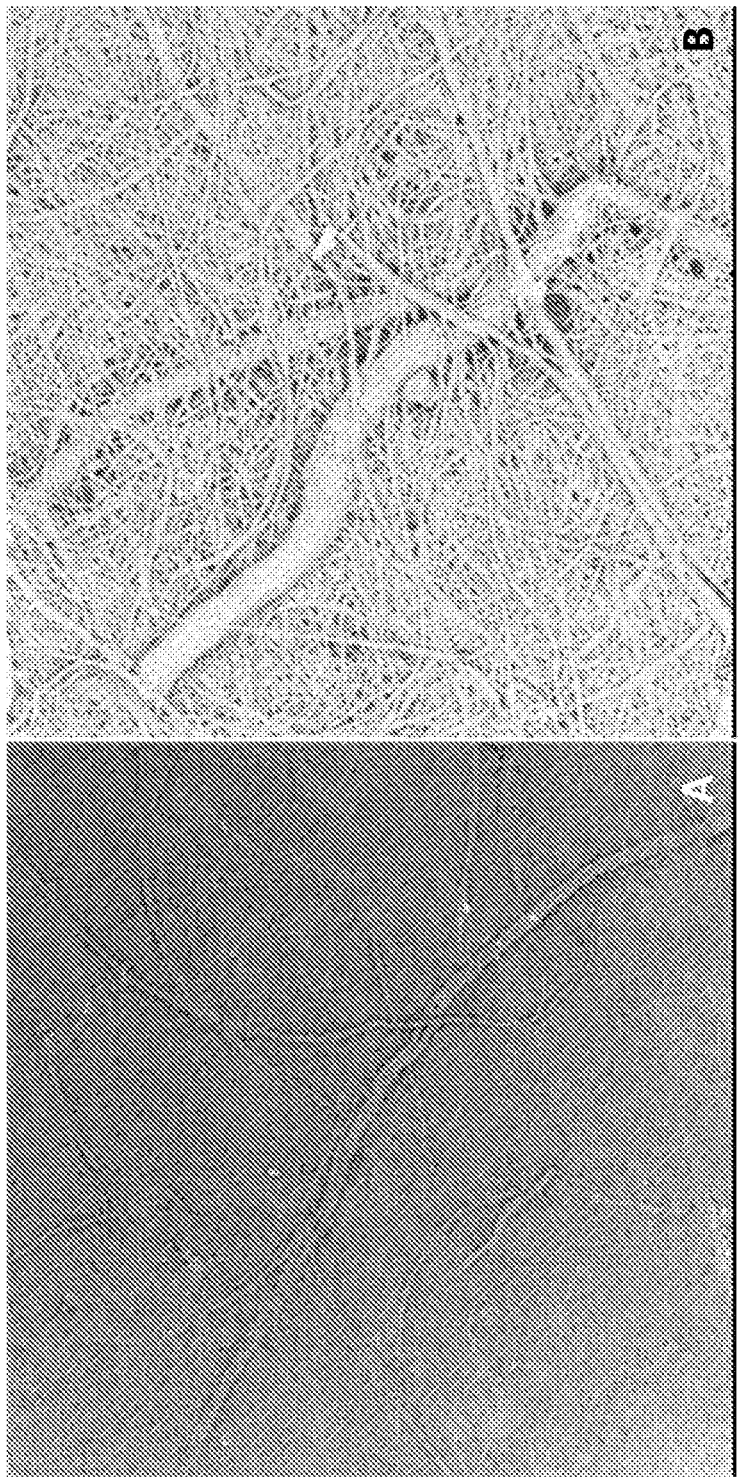
FIGS. 1A and 1B show SEM micrographs of a conventional cellulosic separator.

Reference will now be made in greater detail to various embodiments of the subject matter of the present disclosure, some embodiments of which are illustrated in the accompanying drawings. The same reference numerals will be used throughout the drawings to refer to the same or similar parts.

Useful separator materials exhibit chemical resistance to degradation in the EDLC environment, are readily wetted by the liquid electrolyte, and have mechanical strength and dimensional stability during assembly of the device. Separators are effective in inhibiting migrating of particles between the electrodes.

A variety of materials have been used as separators, ranging from cedar shingles to cellulosic papers to nonwoven fabrics. Cellulosic materials are the most commonly-used separator materials and typically include cellulosic paper sheets that are wound together with the electrodes to form a cylindrical laminate, i.e., jelly roll. Such separators are expensive, however, and require very tight dimensional tolerances with respect to the electrodes. Scanning electron microscope (SEM) images of a conventional cellulosic separator are shown in FIG. 1. Long strands (fibers) of cellulose are evident.

The choice of separator and electrode materials directly affect the performance of the device, including the achievable energy density and power density. The energy density (E) of an EDLC is given by $E=\frac{1}{2} CV^2$, where C is the capacitance and V is the operating voltage. For achieving higher capacitance, activated carbon materials with high surface area (500-2500 $m^2/g$) may be used. More recently, engineered carbon materials have been developed to achieve higher capacitance.

A further approach to increasing the energy density is to increase the capacitor's voltage of operation. In this regard, aqueous electrolytes have been used in EDLCs for lower voltage (<1V) operation, while organic electrolytes have been used for higher voltage (2.3-2.7 V) devices. However, to achieve even higher energy densities, there is a need to increase the voltage envelop from conventional values of about 2.7 V to around 3.0 V. Such an increase from 2.7 to 3.0 V will result in a 23% increase in the energy density.

Operation at higher voltages, however, subjects the EDLC components to several different types of stresses that may lead to faster deterioration. Such stresses include, for example, mechanical stresses on the electrodes due to movement of charged ions back-and-forth into the pores of the activated carbon, and chemical stresses due to generation of by-product gases as well as chemical degradation at higher voltages. The chemical stresses are in most part due to Faradic charge transfer processes in the cell. Conventional cellulosic paper, because it is organic in nature, is prone to embrittlement, particularly at high temperatures and under harsh environments. Specifically, such an organic separator can oxidize at the positive electrode in the presence of water leading to degradation according to $R-CH_2-OH + H_2O \rightarrow R-COH=O+4H^++4e^-$. The process known as oxidative deterioration diminishes the strength of the separator and may possibly lead to a loss of separator integrity.

The degradation is clearly noted via discoloration of the separator from white to deep yellow or brown. The discoloration is due to oxidation of cellulose at high potentials and/or temperature in presence of water. Failure analysis studies using Fourier Transform Infrared Spectroscopy (FTIR) measurements have confirmed increased $C=O$ bonds in the discolored material. These acids can be a source of $H^+$, which can eventually lead to the unwanted formation of $H_2$ gas at the electrode and within the enclosed cell.

According to one embodiment, the inorganic separator as disclosed herein, particularly for incorporation into an EDLC, includes acicular particles of calcium silicate ($CaSiO_3$). Example calcium silicate material includes the naturally-occurring mineral Wollastonite. Wollastonite is a calcium inosilicate mineral that may contain small amounts of iron, magnesium and manganese substituting for calcium.

Figure 2:
FIGS. 2A and 2B show SEM micrographs of calcium silicate particles used in various embodiments.
Figure 2:
Figure 3:
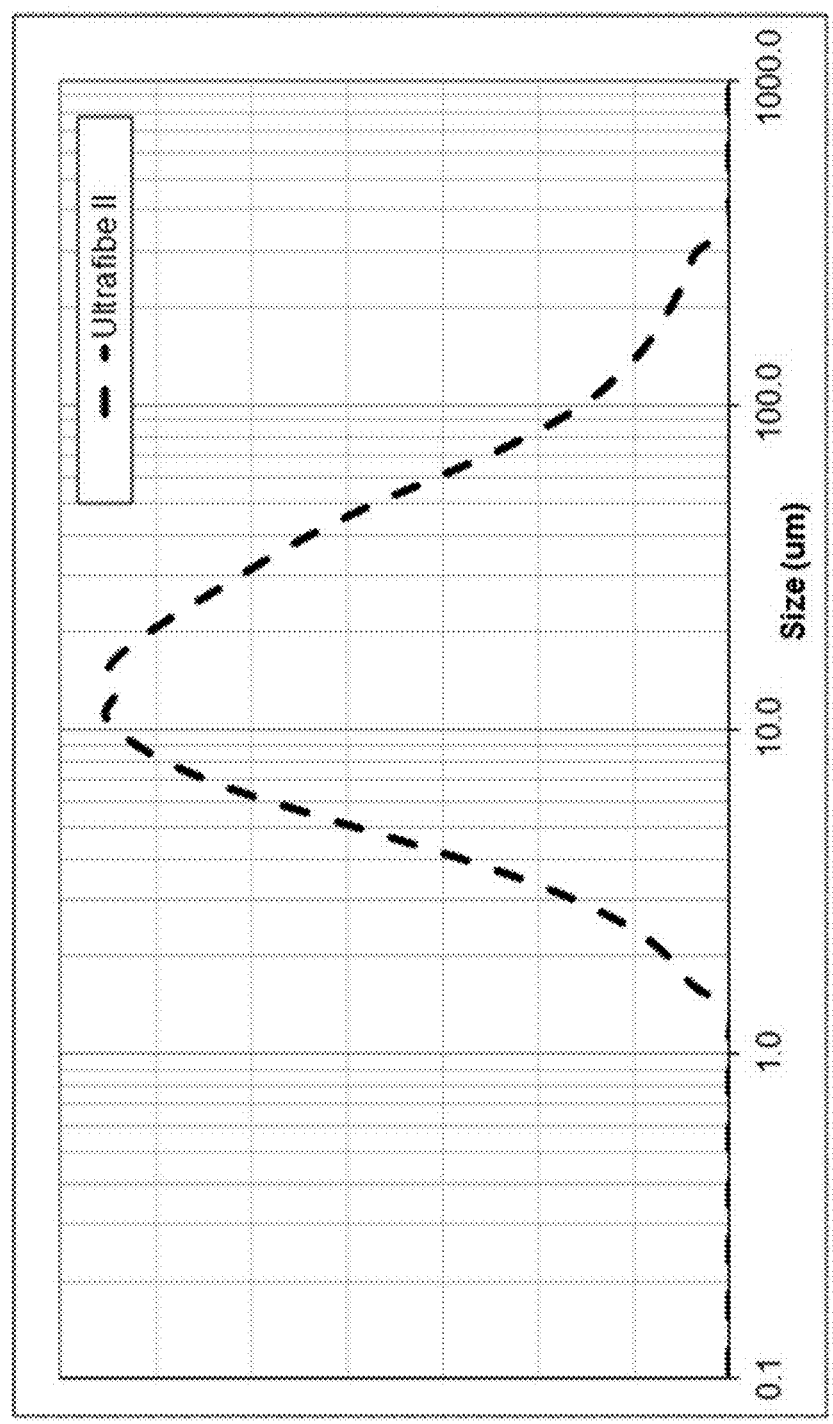
FIG. 3 is a plot of particle size distribution for calcium silicate particles according to one embodiment.

Wollastonite is typified by slender, acicular crystals. Different grades of Wollastonite are depicted in the SEM micrographs of FIG. 2. A medium grade Wollastonite is shown in FIG. 2A, which is characterized by needle-shaped particles having a median diameter of about 12 microns and an aspect ratio of about 7:1. A fine grade Wollastonite is shown in FIG. 2B. The fine grade material is characterized by needle-shaped particles having a median diameter of about 8 microns and an aspect ratio of about 5:1. A histogram showing the particle size distribution of the medium grade material of FIG. 2A is shown in FIG. 3. The particle size distribution was determined using laser scattering.

In embodiments, ceramic materials other than Wollastonite may be used to form the separator layer. Further example acicular (e.g., fibrous) ceramic materials include naturally-occurring aluminosilicate minerals such as halloysite (e.g., halloysite nanotubes) and man-made fibers such as alumina, titania fibers, magnesium aluminosilicate glass fibers (or other glass or ceramic fibers) as well as combinations thereof.

Example acicular particles have a median diameter of less than 15 microns, e.g., less than 15, 12, 10, 8 or 6 microns, including, in embodiments, ranges between any two of the foregoing values. Further example acicular particles have a median diameter of 5 nm to 15 microns, e.g., 0.05, 0.1, 0.2, 0.5, 1, 2, 10 or 15 microns, including ranges between any two of the foregoing values.

Acicular particles may have an aspect ratio of from 2:1 to 30:1, e.g., 2:1, 3:1, 4:1, 5:1, 6:1, 7:1, 8:1, 9:1, 10:1, 15:1, 20:1 or 30:1, including, in embodiments, ranges between any two of the foregoing values. In further embodiments, an aspect ratio of the particles can be greater than 30:1. Alumina nanofibers, for example, may have an aspect ratio of 20 million:1. The aspect ratio of the particles leads to poor packing and forms a porous mat that can be used to electronically insulate the positive electrode from the negative electrode.

The acicular particles themselves are formed of a dense (i.e., non-porous) material. Wollastonite, for example, has a density of about 2.86-3.09 $g/cm^3$, is chemically inert and has negligible loss on drying and loss on ignition making it an ideal choice for improved chemical and high temperature performance. As a result, the resulting ceramic separator provides chemical oxidation resistance that is superior to separators based on organic cellulosic.

In embodiments, the ceramic separator may be at least partially coated with a metal-ligand complex. The metal-ligand complex coating may be applied to the ceramic separator or to the particles of the ceramic material, for example, via dip coating or slot coating.

During device operation, the metal-ligand complex may remove unwanted reactive species from the liquid electrolyte. The acetonitrile carbanion, for instance, is formed by the deprotonation of acetonitrile with carbon surface groups acting as a base or the base generated by Hoffman elimination/decomposition of the tetraethylammonium cation.

The metal of the metal-ligand complex can act as an electron sink which helps in trapping the electron rich acetonitrile carbanion by a displacement reaction on the metal-ligand complex. The newly formed metal-ligand complex can undergo reductive elimination reaction to form an unreactive organic product in the electrolyte and some unreactive metal deposits on a surface of the negative electrode.

Example metals in the metal-ligand complexes include copper, zinc, nickel, cobalt, iron, chromium, titanium, manganese, vanadium, magnesium, aluminum, platinum, palladium, rhodium and ruthenium. Example complex ligands include acetate ($CH_3COO^-$), trifluoroacetate ($CF_3COO^-$), benzoate ($C_6H_5COO^-$), triflate ($CF_3SO_3^-$), cyanate ($CN^-$), thiocynates ($SCN^-$), as well as ammonia ($NH_3$) and pyridine ($C_5H_5N$)-based ligands.

In addition to the inorganic particles, the separator layer includes at least one binder. The separator layer may include, according to various embodiments, 2-25 wt. % binder and 75-98 wt. % acicular inorganic particles, and have a total porosity in a range of 20-70%, e.g., 20, 30, 40, 50, 60 or 70% including, in embodiments, ranges between any two of the foregoing values.

The inorganic separator can be formed on a porous electrode using a slurry process. A slurry mixture comprising the calcium silicate particles (or other suitable particles), binder, and a liquid dispersing medium can be slot coated or roll coated, for example, directly on to an electrode surface and dried. Such an approach can be used to form a separator layer over one or opposing surfaces of a porous electrode. In related embodiments, a separator layer may be formed simultaneously over opposing surfaces of an electrode by dip-coating. As used herein, a layer that is "disposed adjacent to" another layer is located in direct physical contact with that other layer.

Mixtures comprising, as a percentage of solids, up to 25 wt. % binder can be used (e.g., 5, 10 or 20 wt. %). Selected binder materials may be water soluble or soluble in another solvent. Example binder materials include ethylcellulose (e.g., ETHOCEL® from Dow Chemical), a self crosslinking acrylic polymer (e.g., ACRYGEN® from Omnovas), styrene butadiene rubber (SBR), PVDF (polyvinylidene fluoride), PTFE (polytetrafluoroethylene), and latex-based binders as well as combinations thereof. The binder can be a material with a low glass transition temperature, which, in addition to promoting adhesion of the inorganic particles to each other and to the carbon electrode, can ultimately yield a separator layer that does not crack or bend after drying. The binder material may partially or completely coat the inorganic particles. The solid components of an example mixture may include 75 to 98wt. % ceramic material and 2 to 25 wt.%. binder.

In example embodiments, the dispersing medium is a liquid and may include water, alcohol, N-methyl-2-pyrrolidone (NMP) or combinations thereof. An example alcohol is isopropyl alcohol. The dispersing medium may be aqueous or non-aqueous. By way of example, styrene butadiene rubber binder may be used as a binder with a water dispersing medium, and polyvinylidene fluoride may be used with NMP as a dispersing medium. The dispersing medium, in embodiments, is a solvent for the binder. In an example method, a 1-2 wt. % solution of PVDF in NMP can be mixed with a desired amount of the inorganic particles and coated onto the surface of a porous (activated carbon-containing) electrode to form an integrated electrode.

Figure 4:
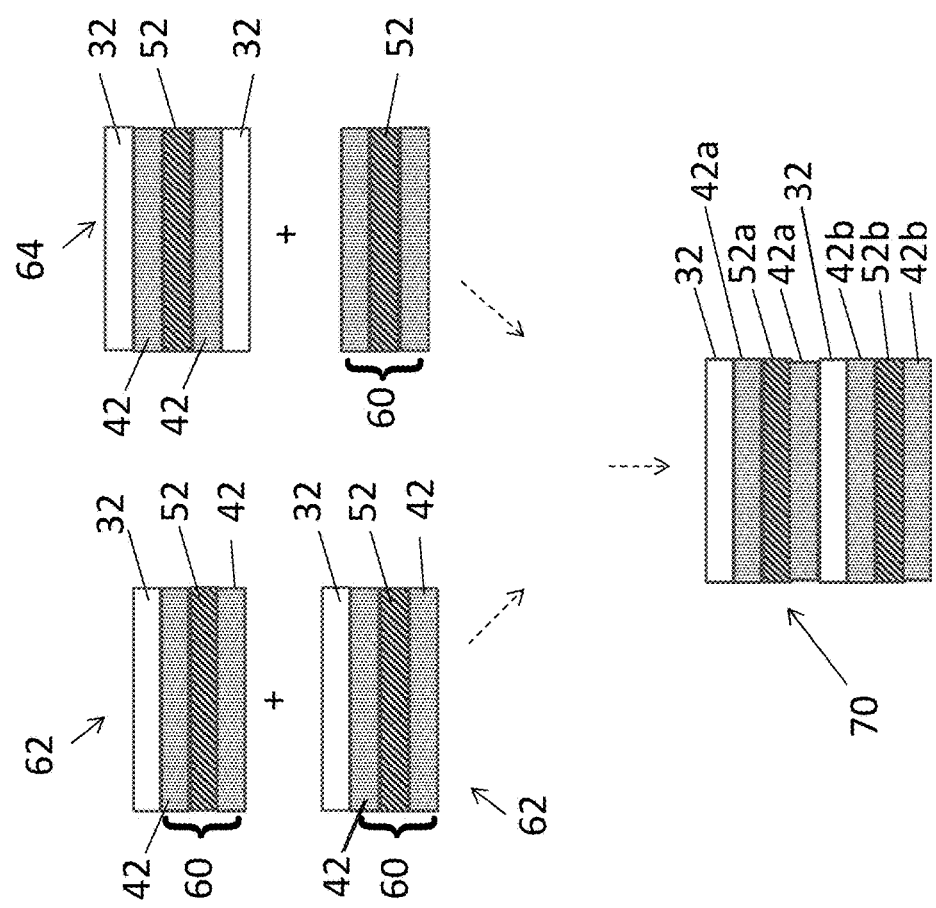
FIG. 4 is a schematic illustration of various slurry methods of forming an EDLC comprising acicular, inorganic particles.

Methods for forming an ultracapacitor are shown in FIG. 4. In one approach, porous electrode (activated carbon-containing) layers 42 are laminated over respective opposing surfaces of current collectors 52 to form a pair of carbon-based electrodes 60. A lamination temperature of up to about 200° C. can be used. Separator layers 32 can in turn be formed over respective exposed surfaces of one of the electrode layers 42 in each of the carbon-based electrodes. The two resulting integrated electrodes 62 can be joined together and wound into a jellyroll to form a portion of an ultracapacitor.

In a related approach, the stacked electrode structure 70 can be manufactured by forming separator layers 32 over the exposed surfaces of both of the electrode layers 42 in one of the carbon-based electrodes 60. The resulting integrated electrode 64, including the pair of separator layers, can be joined together with another carbon-based electrode 60. Thus, in the first approach, a separator layer is disposed adjacent to a surface of one porous electrode in each integrated electrode. In the second approach, a separator layer is disposed adjacent to each of the opposing porous electrode surfaces to form one integrated electrode, which can be rolled together with a second carbon-based electrode that does not include a separator layer.

One embodiment of a portion of an ultracapacitor having calcium silicate-based separators 32 is also shown in FIG. 4. The stacked electrode structure 70 for incorporation into the ultracapacitor includes a pair of negative porous electrodes 42a and a pair of positive porous electrodes 42b, each electrode disposed adjacent to a respective current collector plate 52a, 52b. Inorganic separators 32 separate the negative porous electrodes from the positive porous electrodes. In operation, the negative porous electrodes 42a, the positive porous electrodes 42b, and separators 32 may be impregnated by a liquid electrolyte.

Prior to depositing and forming the separator layers, the receiving electrode surface may be conditioned. Conditioning, such as by wetting the surface, can further promote adhesion between the electrode and the separator. In embodiments, the dispersing medium used to form the separator slurry can be used to wet the surface upon which the separator layer is formed.

Drying of the as-deposited separator may be done at a temperature less than 200° C. (e.g., 100-200° C.) for a suitable time, e.g., 48 hours. The dried separator thickness can be from 5 to 50 microns, e.g., about 5, 10, 20 or 50 microns. After initial drying, the separator-electrode-current collector composite can be rolled into a jellyroll, placed in a cell, and filled with liquid electrolyte. The drying may include vacuum drying, such as vacuum drying of the jellyroll after it is placed in a cell, but before the cell is filled with electrolyte. The drying process removes or substantially removes the dispersing medium from the separator layer.

The slurry process for coating electrodes, which forms the separator layer in situ, enables the use of an ultra-thin separator (~10 μm) which can lead to reduced ESR (electrical series resistance) and improved power performance. These results are not possible with conventional stand-alone separator films due to separator strength requirements.

In an example embodiment, a porous electrode is provided and a separator layer is disposed adjacent to the porous electrode. The porous electrode 42 may include activated carbon, carbon black and a binder such as polytetrafluoroethylene (PTFE).

The coating process used to form the separator can be readily integrated with other steps in electrode manufacturing, and particularly in a case when slurry processes are utilized for electrode fabrication.

EXAMPLES

Figure 5:
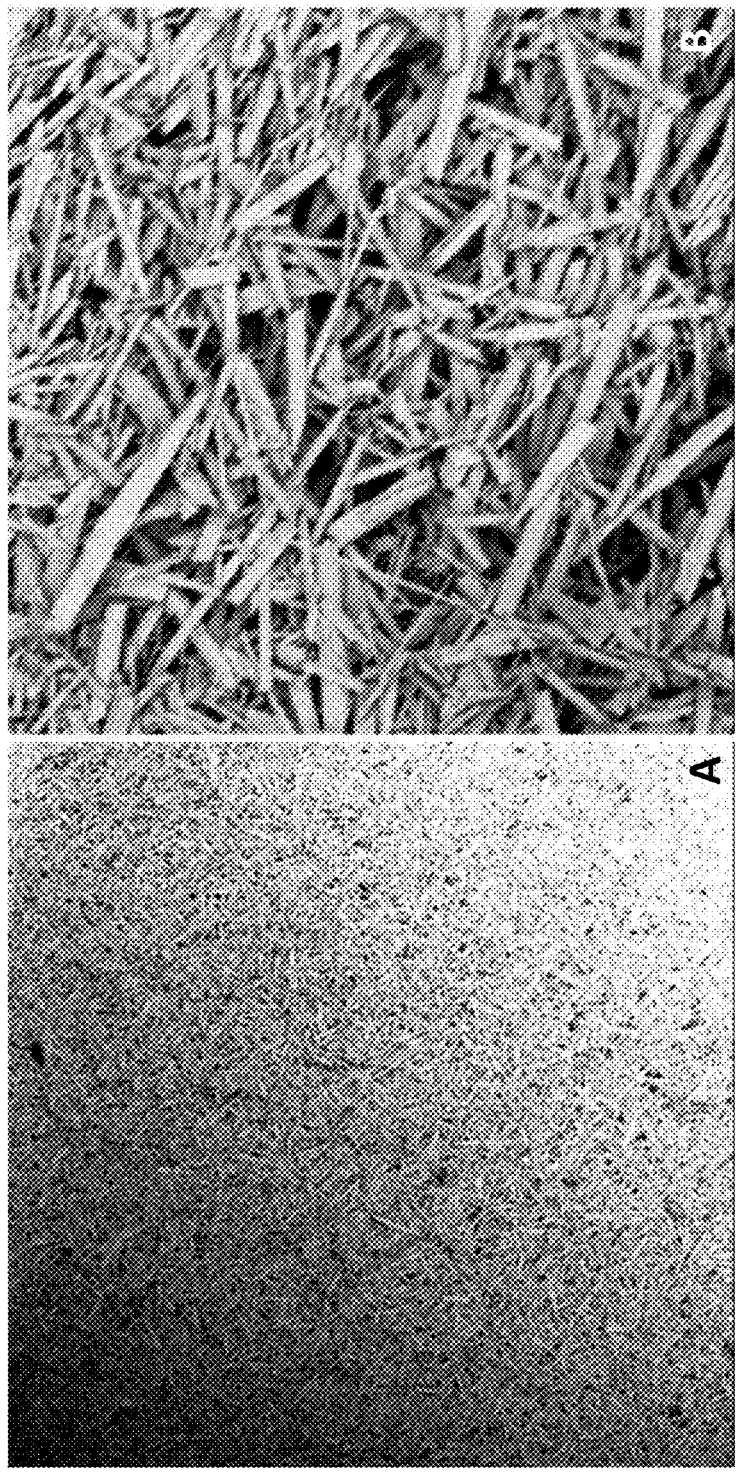
FIGS. 5A and 5B are plan view SEM micrographs of a calcium silicate-based ceramic separator.

Plan view SEM micrographs of a calcium silicate ceramic separator are shown in FIGS. 5A and 5B. Porosity resulting from the inefficient packing of the needle-shaped Wollastonite particles is evident.

Figure 6:
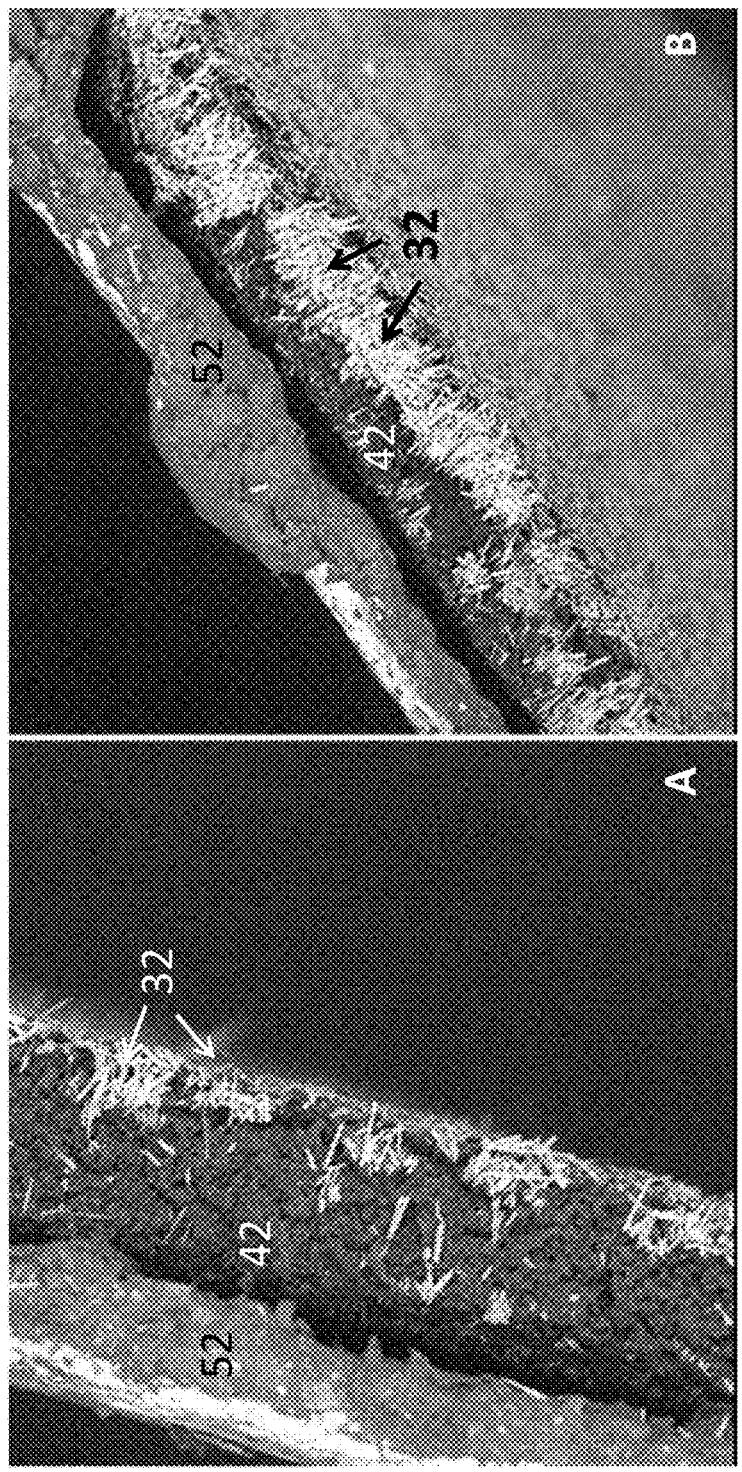
FIGS. 6A and 6B are cross-sectional view SEM micrographs of example calcium silicate-based ceramic separators.
FIGS. 6C and 6D are cross-sectional optical micrographs of example calcium silicate-based ceramic separators.
Figure 6:
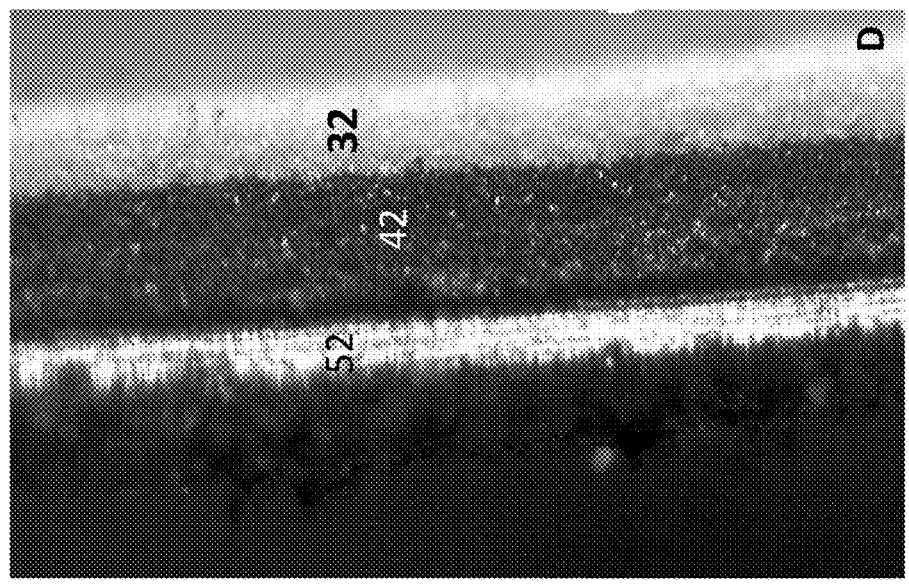
Figure 6:
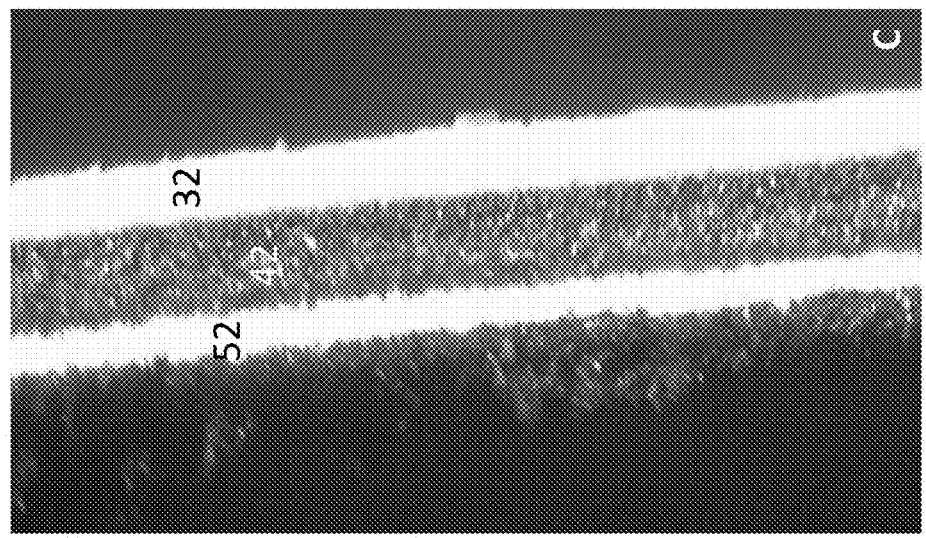

Cross-sectional view SEM micrographs of a calcium silicate ceramic separator incorporated into an electrode are shown in FIGS. 6A and 6B. The average separator layer thickness (wet thickness) in FIG. 6A is about 40 microns and the average separator thickness in FIG. 6B is about 100 microns. The foregoing wet thicknesses correspond to fully dried thicknesses, as shown, of about 10 microns and 25 microns, respectively. Also visible in FIGS. 6A and 6B are a carbon layer 42 and the aluminum metal foil current collector 52. Optical micrographs of a 40 micron (dry thickness) calcium silicate ceramic separator incorporated into an electrode are shown in FIGS. 6C and 6D. Good adhesion between the Wollastonite and the carbon layer is evident for each of these samples.

Figure 7:
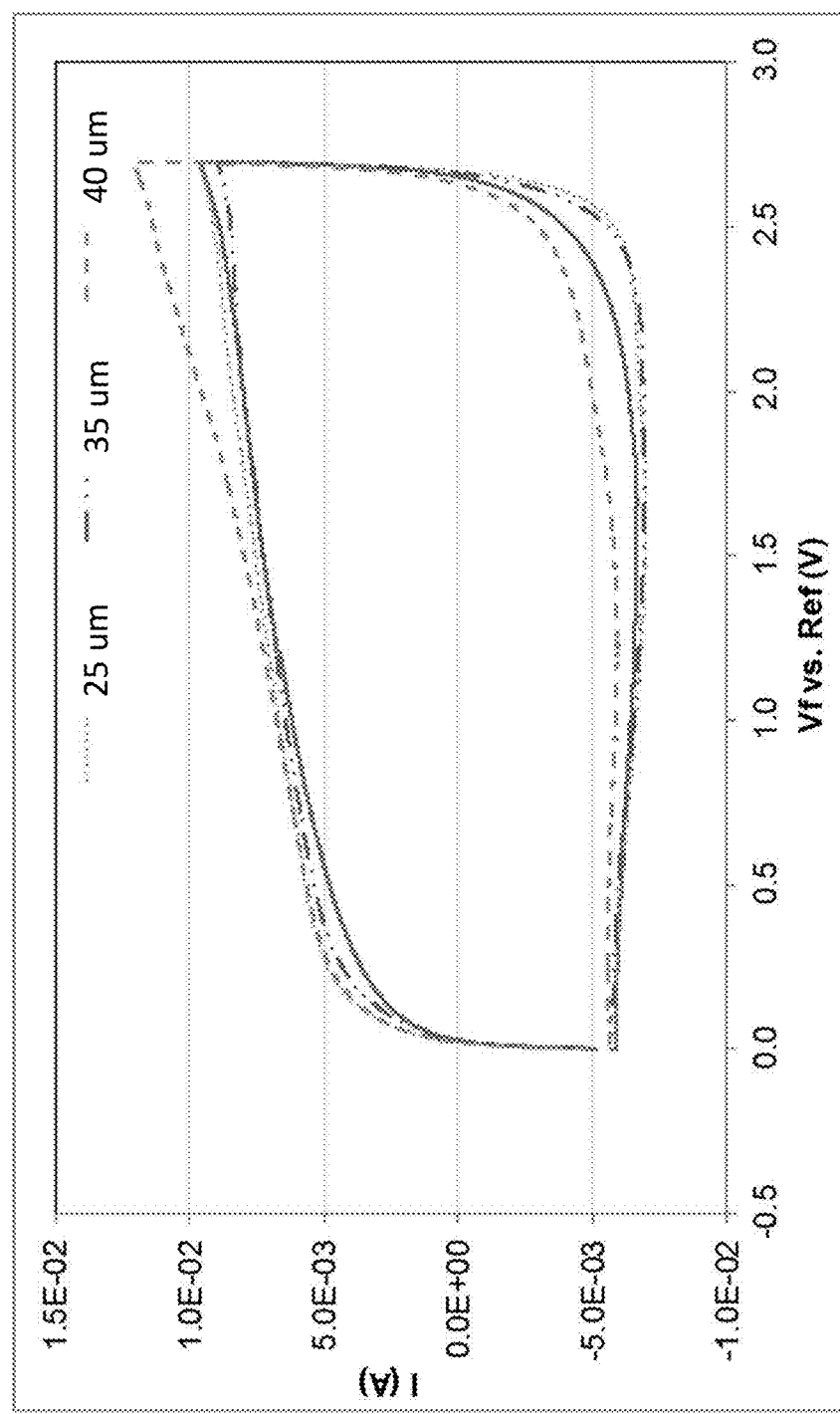
FIG. 7 is series of CV plots for a comparative cellulose paper separator and several calcium silicate separators according to embodiments.
Figure 8:
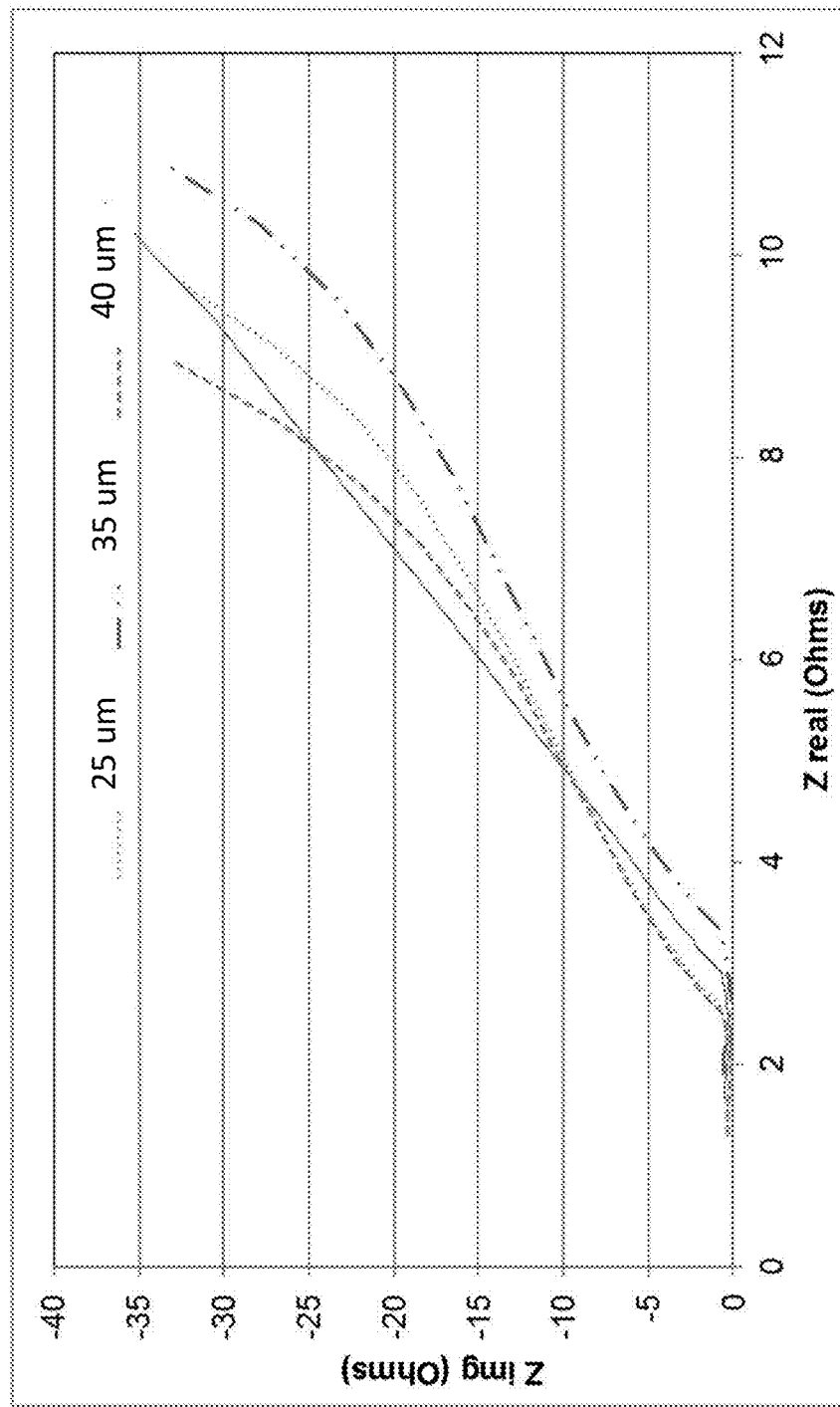
FIG. 8 is a series of Nyquist plots for the cellulose paper separator and calcium silicate separators of FIG. 7.
Figure 9:
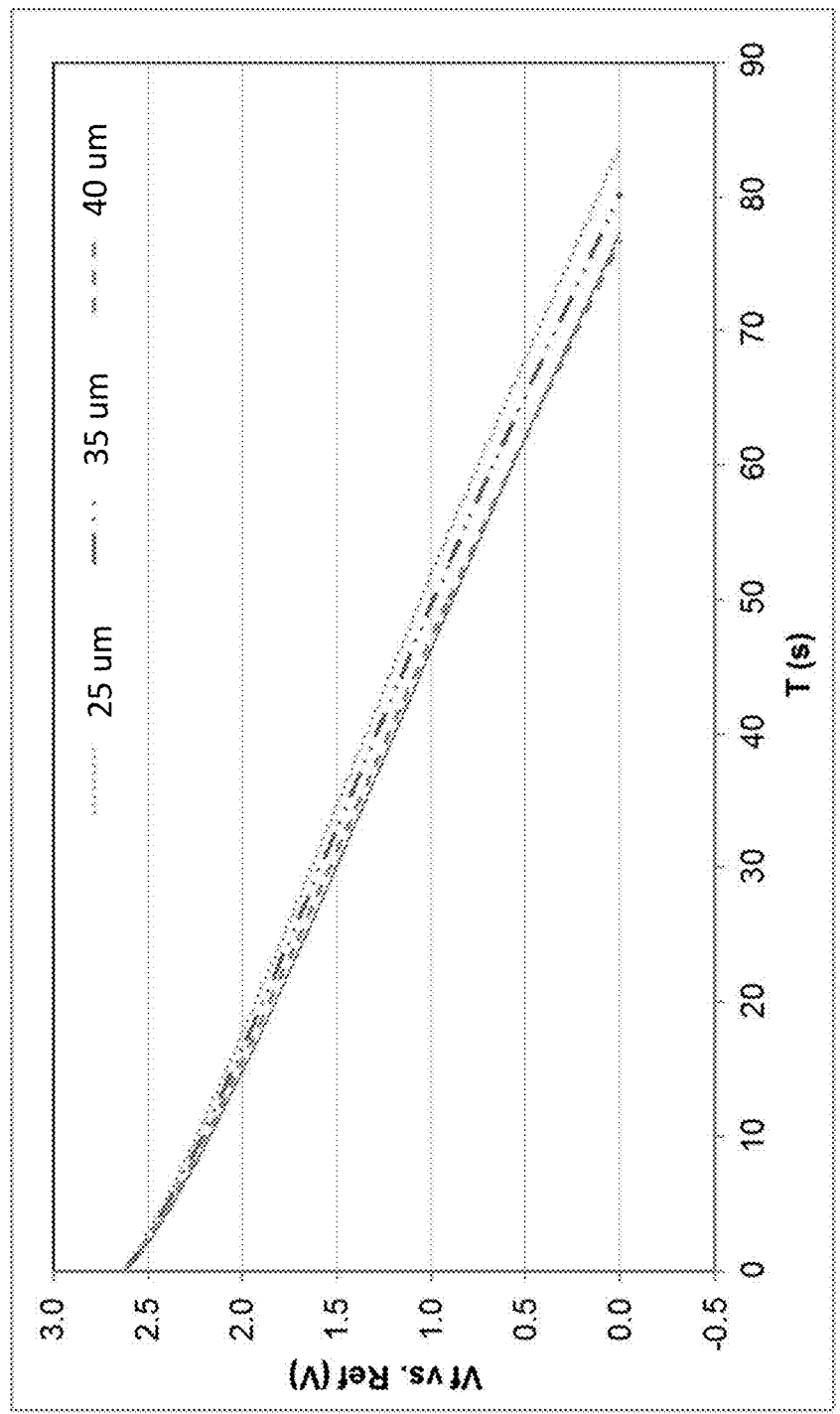
FIG. 9 is a series of plots for button cells having the cellulose paper separator and calcium silicate separators of FIG. 7 showing the cell discharge voltage as a function of time.

Electrochemical performance of the Wollastonite separator coatings was evaluated using button cell capacitors. Electrodes with different separator thickness were fabricated for analysis. FIG. 7 is a series of CV plots comparing the incumbent cellulosic separator (30 micron thickness) with example inorganic calcium silicate separators (25, 35 and 40 micron thicknesses). In FIGS. 7-9 the solid curve corresponds to the comparative cellulosic separator. Performance of the Wollastonite separators appears slightly better than the cellulosic separators as inferred from the shape (rectangularity) and the area under the curves.

FIG. 8 is a series of Nyquist plots comparing a cell having the cellulosic separator of FIG. 7 with cells having the example inorganic calcium silicate separators. Performance of the Wollastonite separators appears slightly better than the cellulosic separators as inferred from the lower x-intercept associated with the 25 and 40 micron ceramic separators.

FIG. 9 is a series of plots depicting the voltage of button cells as a function of time under constant current (20 mA) discharge conditions for the comparative cellulosic separator as well as the example inorganic calcium silicate separators. High voltage decay is an indication of Faradic reactions in the cells. Performance of the Wollastonite separators appears slightly better than the cellulosic separators based on the larger comparative discharge times, which indicates a lower rate of Faradic reactions.

Disclosed is an inorganic separator material that comprises acicular particles such as calcium silicate particles. In addition to providing a material that is resistant to chemical and mechanical degradation, the separator and its attendant methods of production are believed to obviate shrinkage issues that would otherwise lead to short circuits during the cell manufacturing (drying) process. For instance, the use of stand-alone separator paper leads to additional process complexity, particularly with respect to integration. Because one of the functions of the separator is to electrically isolate the two (positive and negative) electrodes, dimensional accuracy and precision in the separator are relevant attributes. In contrast to the ceramic membranes disclosed herein, cellulosic separators are particularly prone to shrinkage during the cell drying process. The current approach remedies many of the shortcomings of the conventional organic separator by forming an inorganic (e.g., Wollastonite particle-containing) separator layer directly on a surface of an EDLC electrode using a slurry-based process.

The coated separator layer is advantageously bonded well with the electrode, and is believed to provide better integrity over conventional separator materials and methods.

As used herein, the singular forms "a," "an" and "the" include plural referents unless the context clearly dictates otherwise. Thus, for example, reference to a "separator" includes examples having two or more such "separators" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a separator that comprises calcium silicate and a binder include embodiments where a separator consists of calcium silicate and a binder and embodiments where a separator consists essentially of calcium silicate and a binder.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. A device comprising:
   an integrated separator comprising an electrode layer and a separator layer disposed adjacent to a first surface of the electrode layer, wherein the separator layer comprises a binder and acicular ceramic particles, and the separator layer is at least partially coated with a metal-ligand complex; and
   a current collector disposed adjacent to a second surface of the electrode layer,
   wherein the metal-ligand complex comprises (a) a metal selected from the group consisting of copper, zinc, nickel, cobalt, iron, chromium, titanium, manganese, vanadium, magnesium, aluminum, platinum, palladium, rhodium, and ruthenium and (b) a ligand selected from the group consisting of acetate, trifluoroacetate, benzoate, triflate, ammonia, and pyridine, and the metal-ligand complex is an electron sink that traps anions during operation of the device by displacing a ligand on the metal-ligand complex.

2. The device of claim 1, wherein the acicular ceramic particles comprise a ceramic material selected from the group consisting of calcium silicate, alumina fibers, magnesium aluminosilicate glass fibers, titania fibers, and combinations thereof.

3. The device of claim 1, wherein the acicular ceramic particles comprise calcium silicate.

4. The device of claim 1, wherein the separator layer consists essentially of calcium silicate and the binder.

5. The device of claim 1, wherein the separator layer comprises 75 to 98 wt. % ceramic particles and 2 to 25 wt. % binder.

6. The device of claim 1, wherein the binder is selected from the group consisting of ethylcellulose, a self-crosslinking acrylic polymer, styrene butadiene rubber, polyvinylidene fluoride, polytetrafluoroethylene, latex-based binders and combinations thereof.

7. The device of claim 1, wherein the electrode layer comprises activated carbon.

8. The device of claim 1, wherein the electrode layer comprises activated carbon, carbon black, and a binder.

9. The device of claim 1, wherein the acicular ceramic particles have an aspect ratio of at least 2:1.

10. A device comprising:
an integrated separator comprising a separator layer and an electrode layer, wherein the integrated separator comprises opposing surfaces disposed adjacent to first and second current collectors; and
an electrolyte,
wherein the separator layer comprises a binder and acicular ceramic particles,
the separator layer is at least partially coated with a metal-ligand complex comprising (a) a metal selected from the group consisting of copper, zinc, nickel, cobalt, iron, chromium, titanium, manganese, vanadium, magnesium, aluminum, platinum, palladium, rhodium, and ruthenium and (b) a ligand selected from the group consisting of acetate, trifluoroacetate, benzoate, triflate, ammonia, and pyridine, and
during operation of the device the metal-ligand complex acts as an electron sink for trapping anions in the electrolyte by displacing a ligand on the metal-ligand complex.

11. The device according to claim 10, where the acicular ceramic particles comprise a ceramic material selected from the group consisting of calcium silicate, alumina fibers, magnesium aluminosilicate glass fibers, titania fibers, and combinations thereof.

12. The device according to claim 10, wherein the separator layer consists essentially of calcium silicate and the binder.

13. The device according to claim 10, wherein the separator layer is impregnated by a liquid electrolyte.

14. The device according to claim 10, wherein the device is selected from the group consisting of an EDLC, hybrid capacitor, fuel cell and battery.

* * * * *